United States Patent [19]

Jamentz

[11] Patent Number: 5,077,900
[45] Date of Patent: Jan. 7, 1992

[54] FAT SKIMMING LADLE

[76] Inventor: Robert K. Jamentz, 1559 Wembley Rd., San Marino, Calif. 91108

[21] Appl. No.: 575,675

[22] Filed: Aug. 31, 1990

[51] Int. Cl.⁵ .............................................. A47J 43/28
[52] U.S. Cl. ...................................... 30/326; 30/324; 30/123
[58] Field of Search .................. 30/324, 326, 325, 327, 30/328, 123, 1

[56] References Cited

U.S. PATENT DOCUMENTS

| | | | |
|---|---|---|---|
| 118,140 | 8/1871 | Loeb | 30/326 |
| 148,911 | 3/1948 | Comeau | 30/324 |
| 175,599 | 4/1876 | Fisher | 30/324 |
| 1,057,269 | 3/1913 | Prestien | 30/123 |
| 1,654,980 | 1/1928 | Duc | 30/326 |
| 2,391,215 | 12/1945 | Zabel et al. | 30/325 |
| 4,040,185 | 8/1977 | Jacobi | 30/326 |
| 4,825,551 | 5/1989 | Sherblom | 30/325 |
| 4,839,965 | 6/1989 | Levie | 30/324 |
| 5,005,294 | 4/1991 | Roberts et al. | 30/324 |

FOREIGN PATENT DOCUMENTS

| | | | |
|---|---|---|---|
| 1126617 | 7/1956 | France | 30/325 |
| 2370457 | 7/1978 | France | 30/324 |

Primary Examiner—Douglas D. Watts
Assistant Examiner—Hwei-Siu Payer
Attorney, Agent, or Firm—William H. Maxwell

[57] ABSTRACT

A fat skimmer in the form of a ladle having a deep vessel bowl with a rim at which there are ports for the transfer of surrounding fatty liquid into the vessel, determined by manipulation controlled by a locator associated with the rim.

21 Claims, 2 Drawing Sheets

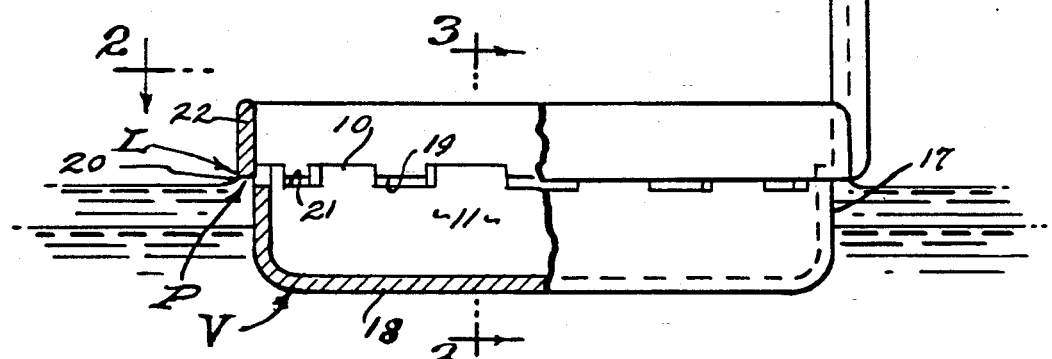
FIG. 1.
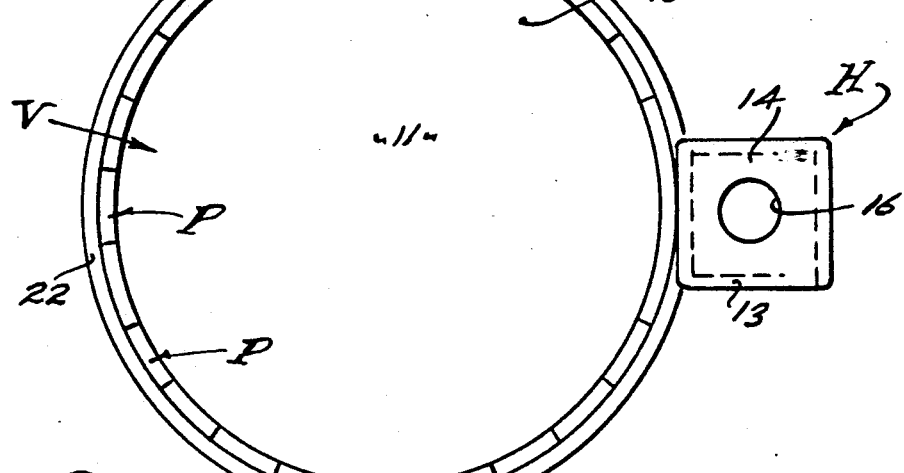
FIG. 2.
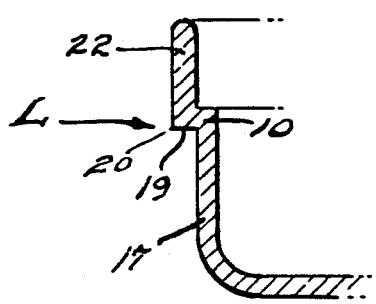
FIG. 3.
FIG. 4.

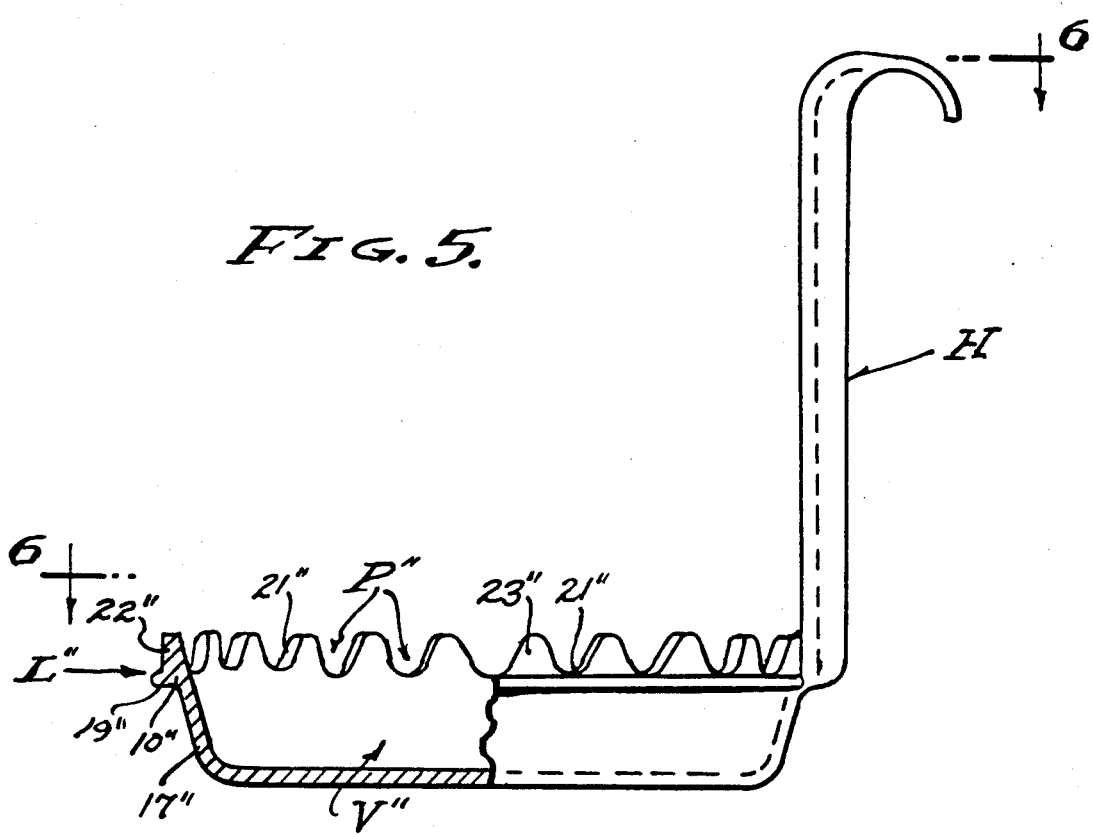
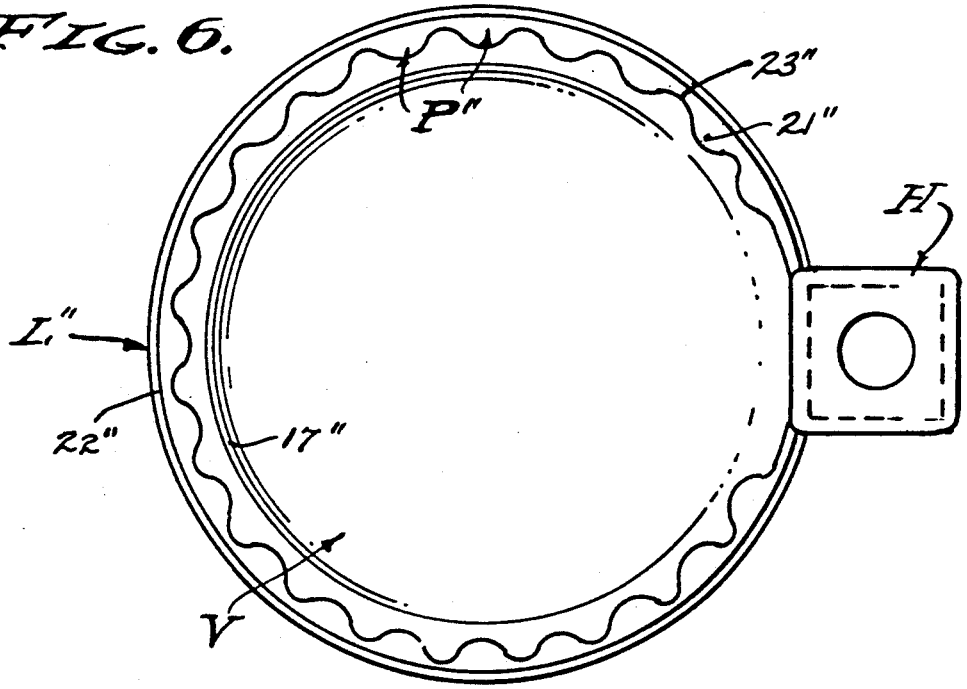

FAT SKIMMING LADLE

BACKGROUND OF THE INVENTION

The removal of fats, oils and grease floating in roasting pans and pots in which meats have been rendered is troublesome. The basic process of removal is by pouring it off, which if most often impractical, or by scooping and or skimming it off. For this purpose spoons, cups and ladles have been used, all dependent upon careful manipulation, and usually with difficulty. Therefore, separating devices have been proposed but with considerable complexity and not altogether satisfactory in regard to facility. For example, a layer of accumulated fat can be lifted off when chilled, but this is not always possible, as and when about to serve a meal and fatty drippings must be removed for making a gravy or the like. Thus, it is the floating top layer of grease and/or fat that is of concern here, the top liquid layer floating in a roaster or stock-pot. Accordingly, it is a general object of this invention to provide a skimming device in the form of a ladle that will skim the fat or oil floating on the top of food or other liquids, such as broth or soup, for its removal and subsequent good use or disposition. Essentially, the skimming device herein disclosed is a ladle, a deep bowled long handled vessel adapted for dipping away a floating layer of fat or oil.

Hot fats, oil and grease rise and form a uniform layer thereof floating on underlying liquids in the processes of roasting and cooking in roasters and pots. The thickness of said fatty layers will vary dependent upon the amount of renderings available in the meats being roasted or cooked. Often there is an excess fatty layer to be removed, or at least reduced, it being an object of this invention to selectively remove said fattey layer, and at least substantially so. To these ends the ladle-like device of the present invention has a vessel for the reception of liquid fat, a locator means for leveling the device with the top surface of the fatty layer, and at least one port located at said top surface for transfer of a determined depth of liquid fat from said fatty layer thereof. In practice, said determined depth is very small so that a thin layer of fat can be skimmed, while there is a multiplicity of peripheral ports so that transfer of liquid is into the vessel. Accordingly, it is an object of this invention to provide locator means, preferably in the form of a peripheral flange that is manipulated into a level position with respect to the top surface of the fatty layer, whereby capillary attraction is used as a visual gage.

It is an object of this invention to combine indicator means with a peripheral port or ports whereby the depth of said port or ports in the fatty layer is predetermined. Thus, there is a limit to the isolated extraction when the fatty layer is reduced to that depth. Accordingly, the depth of the transfer port or ports is restricted beneath the locator means as shown in the form of a continuous peripheral flange. However, this restriction does not limit the free flow of liquid fat through the transfer port or ports. Therefor and in accordance with this invention, the transfer port or ports are also horizontally disposed as they open through the peripheral flange, a unique feature made possible by the shut-off feature of the mold in the manufacture of these particular devices. It is to observed that the skimming device as it is disclosed herein is a monolithic molding, for example of injection molded plastic, in simple male and female mold sections without the use of slides or movable cores, the transfer ports being formed by offset shut-off features in the mold.

SUMMARY OF THE INVENTION

This invention relates to the skimming of fatty liquid from the top surface of renderings in roasters and from stock-pots and the like. The thickness of fatty layers will vary, however it is most desirable to selectively remove only a very shallow or limited depth of said layer, regardless of its original depth, until said layer thickness is reduced to said limited depth (a predetermined minimum depth). To these ends, the fat skimmer is in the form of a ladle that is characterized by a vessel for immersion into the fatty liquid layer, and positioned manually according to locator means in the form of a rim that interfaces with the top surface of the fatty layer, so as to be observed by its capillary attraction to said surface. Collection of fatty liquid in the vessel is by means of the transfer port or ports of restricted depth contiguous to and located by the locator means rim. In practice, this skimmer ladle floats and is manually depressed into the liquid transfer position, simply by placing the locator means rim into interfaced capillary engagement with the top surface of the fatty liquid layer to be skimmed from the roaster or pot.

The foregoing and various other objects and features of this invention will be apparent and fully understood from the following detailed description of the typical preferred forms and applications thereof, throughout which description reference is made to the accompanying drawings in which.

THE DRAWINGS

FIG. 1 is a side elevation of the Fat Skimming Ladle, a portion thereof being broken away to show in section.

FIG. 2 is a plan view taken as indicated by line 2—2 on FIG. 1.

FIG. 3 is a fragmentary section taken as indicated by line 3—3 on FIG. 1.

FIG. 4 is a sectional view similar to FIG. 3, and shows a second embodiment. And, FIGS. 5 and 6 show a third embodiment, FIG. 5 being a view similar to FIG. 1, and FIG. 6 being a plan view taken as indicated by line 6—6 on FIG. 5.

PREFERRED EMBODIMENTS

Referring now to the drawings, this Fat Skimming Ladle is shown as an injection molded article comprised generally of a vessel V carried by a handle H, with locator means L at its rim 10, and having one or more liquid transfer ports P. The article shown is an injection molded plastic device of monolithic form and of ladle configuration having a deepened bowl 11 carried by an upstanding handle H. FIG. 1 shows a round plan form, but other plan forms are acceptable. The upstanding handle H projects from the rim 10 periphery and is reinforced with side ribs 13, and terminates at a header 14 with a depending hook 15 and an opening 16 in the header for hanging.

The vessel V has a peripheral wall 17 closed by a bottom 18, forming a deep bowl for the reception of liquid fat transferred thereto from the surrounding layer thereof in a roaster or pot. The vessel is open topped, its rim 10 being horizontally disposed in a plane normal to its central axis, when of cylinder shape as shown. The handle H is integral with the rim 10 and projects upwardly therefrom as shown. And, it is the rim 10 that is positioned parallel to and at the top surface of the liquid fat layer to be skimmed.

The locator means L is a structural part of the rim 10 that is height related to and for positioning the port or ports P. In its basic form the locator means L is the threshold (21) of the transfer port or ports P as is upwardly visible for positioning thereof at or slightly above the top surface of the liquid fat layer to be skimmed. In its preferred form the locator means L is a part that is visible for interfaced positioning at said top surface. Having touched and being wetted with the liquid fat, capillary attraction occurs, the embodiment of the locator means L being a downwardly faced step or shoulder 19 that interfaces with the top surface of the liquid fat layer. As shown, the outer edge 20 of shoulder 19 presents a rather sharp locating corner from which the surface of the surrounding liquid draws upwardly or downwardly as the device is raised or lowered. The vertical distance of capillary adhesion will vary with different fats and oils or grease, however all within a short manipulation range. In practice, the shoulder 19 encompasses the peripheral wall 17 of the device, so that visible leveling is facilitated, whereby the rim 10 can be easily positioned at the top surface of the liquid fat layer.

The liquid transfer port or ports P is a means for floating away the layer of fatty liquid when the shoulder 19 is interfaced with and/or slightly depressed into the top surface of the fatty liquid layer. Accordingly, the port P in each instance, opens through the peripheral side wall 17 at and below the level of shoulder 19, and each port has a lower threshold 21 spaced a very limited distance below said shoulder and its control edge 20. The vertical distance is the determining control over the thickness of the depth of fatty liquid to be skimmed. However, this discrete minimal distance does not preclude draining off deeper layers until said minimum distance is reached. Accordingly, when positioned upon a fatty liquid surface, as shown in FIG. 1, the limited depth of liquid is transfered into vessel V.

In order to restrict the transfer of a limited height layer of fatty liquid, the rim 10 carries a surrounding dam 22 within the confines of the positioning edge 20. In accordance with this invention, the dam 22 is an upstanding peripheral wall at or outside the outer side of wall 17, whereby a mold shut-off can close in order to form the port or ports P. In FIG. 1 the inner side of dam 22 and outer side of wall 17 are aligned for radial liquid flow. However, in the FIG. 4 embodiment the inner side of dam 22' and outer side of wall 17' are radially separated for augmented flow of liquid upwardly and radially inward, thereby increasing flow capability without lowering the threshold 21'. Thus, free flow and rapid flooding of the vessel V is accomplished when skimming off very thin layers of fatty liquids. The height of dam 22—22' can vary as indicated and as circumstances require.

Referring now the third embodiment shown in FIGS. 5 and 6 of the drawings, the locator means L" and rim 10" are modified to accomodate an upwardly open liquid transfer port or ports P". The deep bowl configuration of the vessel V" remains the same, except for the downwardly convergent peripheral wall 17", for side clearance when in use. The locator means L" is a mark and preferably a structural bead 19" at the periphery of rim 10", and above which the dam 22" rises as a barrier to surrounding chunks of material to be excluded from the transfer process (the same as with the dams 22 hereinabove described). It is the bead 19" that presents a relatively sharp locating corner or edge from which the surface tension of the surrounding liquid draws as the device is raised or lowered. In this third embodiment, the port threshold 21" is coincidental with the top of bead 19", and both of which are depressed in order to cause transfer of the top surface of fatty liquid into the vessel V". A feature of this third embodiment is that the port or ports P" are upwardly opening notches for observation and for cleaning access. In practice, the ports P" are relatively small serrations into the top of dam 22", substantially coextensive with the periphery of vessel V", with concavely rounded thresholds 21", and with intervening fingers 23" forming an encompassing comb that precludes the passage of large chunks of material. The fingers 23" are of moderate height as shown. Operation is by manipulating the locator bead 19" into capillary engagement with the top surface of the fatty liquid layer to be skimmed, and by slight further depression thereof that breaks the capillary engagement for radial inward flow and transfer of the liquid surface over the port threshold and into the vessel V". The comb configuration precludes the passage of chunky materials.

From the foregoing it will be understood how a very thin layer of fatty liquid is skimmed from the top surface of a layer thereof and into the ladle shaped vessel, for subsequent removal. The locator means of the device is manipulated into a horizontal position with the bead or shoulder thereof at or interfaced with the top surface of the fatty liquid layer, whereupon the liquid transfer ports permit the free flow from the manipulated depth and into the vessel. It is the threshold depression of the ports that determines the thickness of the liquid layer to be skimmed.

Having described only the typical and preferred forms and applications of my invention, I do not wish to be limited or restricted to the specific details herein set forth, but wish to reserve to myself any modification or variations that may appear to those skilled in the art, as set forth within the limits of the following claims.

I claim:

1. A fat skimming device in the form of a ladle, and comprising;
   a deep bowled vessel adapted to be immersed in a fatty liquid layer,
   a horizontal rim at an open top of the vessel and with an upstanding dam coextensive therewith to face against a surrounding fatty liquid layer,
   and at least one liquid transfer port below the dam and through said rim and with a threshold means spaced below a shoulder on said rim adapted to visibly interface with the surrounding fatty liquid surface to position said rim at the surface of said fatty liquid layer for skimming the surface of said fatty liquid layer over said threshold means and into the vessel.

2. The fat skimming device as set forth in claim 1, wherein a handle extends from the vessel for manipulation.

3. The fat skimming device as set forth in claim 1, wherein the rim is peripheral.

4. The fat skimming device as set forth in claim 1, wherein the rim peripherally encompasses the open top of the vessel.

5. The fat skimming device as set forth in claim 1, wherein the rim and dam peripherally encompass the open top of the vessel.

6. The fat skimming device as set forth in claim 1, wherein there is a multiplicity of liquid transfer ports peripherally spaced around and open into the vessel for skimming the surrounding surface of said fatty liquid layer into the vessel.

7. The fat skimming device as set forth in claim 1, wherein a handle extends from the vessel for manipulation, wherein the rim and dam peripherally encompass the open top of the vessel, wherein there is a multiplicity of liquid transfer ports peripherally spaced around and open into the vessel for skimming the surrounding surface of said fatty liquid layer into the vessel.

8. The fat skimming device as set forth in claim 1, wherein the at least one liquid transfer port is a notch-shaped opening in the top of the dam, and wherein the means adapted to position said rim is a bead on the rim for engaging with the surface of said fatty liquid layer.

9. The fat skimming device as set forth in claim 1, wherein the at least one liquid transfer port is a notch-shaped opening in the top of the dam and with a threshold for the transfer of the liquid thereover and into the vessel, and wherein the means adapted to position said rim is a peripheral bead on the rim coincidental with the threshold to position the same.

10. The fat skimming device as set forth in claim 1, wherein there is a multiplicity of liquid transfer ports in the form of notches spaced peripherally around and open into the vessel and separated by fingers forming a comb for excluding chunky materials when skimming the surrounding surface of said fatty liquid layer into the vessel.

11. A fat skimming device in the form of a ladle, and comprising;
   a deep bowled vessel adapted to be immersed in a fatty liquid layer,
   a horizontally flanged rim at an open top of the vessel and with an upstanding dam coextensive with and to face against the surrounding fatty liquid layer,
   threshold means spaced below a downwardly faced step on the flanged rim to interface with and position said flanged rim at the surface of said fatty liquid layer,
   and at least one liquid transfer port immediately below said dam and through said flanged rim and open into the vessel for skimming the surface of said fatty liquid layer over the threshold means and into the vessel.

12. The fat skimming device as set forth in claim 11, wherein a handle extends from the vessel for manipulation.

13. The fat skimming device as set forth in claim 11, wherein the rim is peripheral.

14. The fat skimming device as set forth in claim 11, wherein the rim and dam peripherally encompass the open top of the vessel.

15. The fat skimming device as set forth in claim 11, wherein the downwardly faced step adapted to position said rim is a shoulder on the rim for interfacing with the surface of said fatty liquid layer.

16. The fat skimming device as set forth in claim 11, wherein said at least one liquid transfer port opens upwardly through said flanged rim and at an inside wall of the dam, for augmented flow of fatty liquid.

17. The fat skimming device as set forth in claim 11, wherein there is a multiplicity of liquid transfer ports peripherally spaced around and open into the vessel for skimming the surrounding surface of said fatty liquid layer into the vessel.

18. The fat skimming device as set forth in claim 11, wherein there is a multiplicity of liquid transfer ports peripherally spaced around and open into the vessel and opening upwardly through said flanged rim and at an inside wall of the dam for skimming the surrounding surface of said fatty liquid layer into the vessel.

19. The fat skimming device as set forth in claim 11, wherein a handle extends from the vessel for manipulation, wherein the flanged rim and dam peripherally encompasses the open top of the vessel, wherein the downwardly faced step adapted to position said rim is a peripheral edge of the flanged rim and with a shoulder for interfacing with the surface of said fatty liquid layer, and wherein there is a multiplicilty of liquid transfer ports peripherally spaced around and open into the vessel and opening upwardly through said flanged rim and at an inside wall of the dam for skimming the surrounding surface of said fatty liquid layer into the vessel.

20. The fat skimming device as set forth in claim 11, wherein the rim peripherally encompasses the open top of the vessel.

21. The fat skimming device as set forth in claim 20, wherein the downwardly faced step adapted to position said rim is a peripheral shoulder of the rim for interfacing with the surface of said fatty liquid layer.

* * * * *